United States Patent [19]

West et al.

[11] 4,194,663

[45] Mar. 25, 1980

[54] HYDROMECHANICAL PLASTIC WEB INDEXING SYSTEM FOR SYNTHETIC PLASTICS THERMOFORMING MACHINERY

[75] Inventors: George A. West, Clare; Albert W. Arends, Gladwin; George L. Pickard, Beaverton, all of Mich.

[73] Assignee: Leesona Corporation, Beaverton, Mich.

[21] Appl. No.: 927,359

[22] Filed: Jul. 24, 1978

[51] Int. Cl.² ............................................. B65H 17/26
[52] U.S. Cl. ...................................................... 226/139
[58] Field of Search ................................ 226/133–139, 226/141; 83/241, 242; 425/383

[56] References Cited

U.S. PATENT DOCUMENTS

| | | | |
|---|---|---|---|
| 3,707,255 | 12/1972 | Ridgway et al. | 226/136 |
| 3,748,078 | 7/1973 | Schott, Jr. | 425/383 |
| 4,029,250 | 6/1977 | Tall | 226/136 |
| 4,061,260 | 12/1977 | Copp | 226/139 |

*Primary Examiner*—Leonard D. Christian
*Attorney, Agent, or Firm*—Learman & McCulloch

[57] ABSTRACT

An indexing system for synthetic plastics molding machinery, wherein plastic web gripping drive elements are employed to feed a plastic web in planar indexing movements to the molds of the machine, utilizes a conventional pump driven hydraulic motor connected with the web gripping drive elements by drive transmission mechanism incorporating a brake for positively halting the web gripping elements in predetermined position. A stroke measuring control device driven by the drive transmission mechanism in a path of movement corresponding with the indexing moving of the web gripping elements first decelerates the movement of the web gripping elements and then positively halts them in a predetermined position. Alternatively, a photoelectric eye sensitive to the position of the web can stop the web.

9 Claims, 5 Drawing Figures

HYDROMECHANICAL PLASTIC WEB INDEXING SYSTEM FOR SYNTHETIC PLASTICS THERMOFORMING MACHINERY

TECHNICAL FIELD

The invention relates generally to thermoforming methods and machinery for molding or forming articles in synthetic plastic web material, and more specifically to a new hydromechanical drive system for very accurately accomplishing lengthy indexes at high speeds to provide a significant increase in thermoforming output rates, the extent of increase being dependent upon the material being processed and the nature of the products being formed. Such machinery typically vacuum or pressure forms containers and other objects in deformable plastic webs which are supplied between the separated molds of the forming machinery in a heated, deformable state which permits them to be differential pressure-formed. Normally, in such machinery, a heating station is provided upstream from the platens for carrying the molds and the sheet is first indexed to the oven and remains there for a dwell period during which heating of the sheet takes place. The sheet is then indexed by the same web carrying chains to a position aligned with the molds of the thermoforming machine. The new system is designed for long indexing movements, and to provide very low maintenance costs. The system is also designed to provide a registered index capability in connection with preprinted web material.

BACKGROUND OF THE INVENTION

Previously, various systems have been used for driving the sheet advancing chains in machinery of this character and, for example, various systems are disclosed in U.S. Pat. Nos. 2,451,467; 2,708,575; 2,862,233; 2,991,826; 3,217,852; 3,748,078; 3,776,804; and 3,884,129.

In one such prior art patent, a rack gear is used to power the drive transmission shaft, in contradistinction to the present invention, wherein a rack functions as a stroke measuring element and accomplishes a different purpose. In other systems, special and expensive (to purchase and service) hydraulic motors are required.

BRIEF SUMMARY OF THE INVENTION

The invention relates to certain improvements made in indexing drive systems for plastic web gripping and advancing chains which, in an inexpensive and yet reliable manner, provide precision long stroke indexing. A conventional, pump driven hydraulic motor can be coupled via a drive transmission mechanism with the plastic web gripping chains and a separate linear stroke measuring device, which does not form a part of the drive train, is employed with control elements for first decelerating the speed of index of the chains at the end of the stroke and then for positively stopping the web gripping chains in precise position. The stroke measuring device controls the length of the stroke and permits adjustment of the stroke length.

Other objects and advantages of the invention will be pointed out specifically or will become apparent from the following description when it is considered in conjunction with the appended claims and the accompanying drawings, in which:

Figure 1:
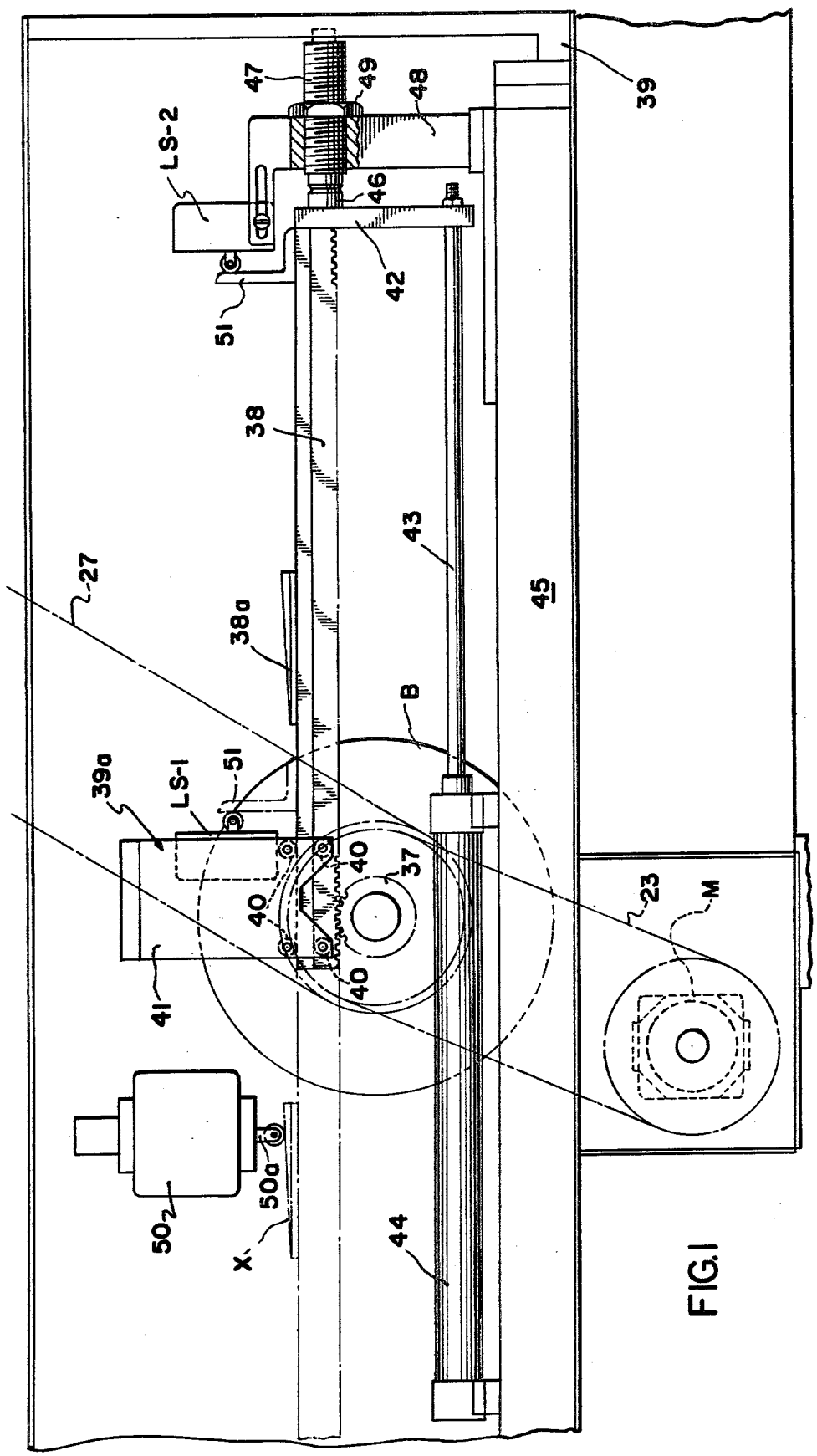
FIG. 1 is an enlarged, side elevational fragmentary view of a differential pressure forming machine, illustrating essentially only the stroke measuring part and control elements.

Referring now more particularly to the accompanying drawings, the frame of the thermoforming machine is generally designated F and may comprise transversely spaced side frame members 10 and 11 with channel beams 12 mounted at an upper end thereof for supporting a series of shafts 13, which carry the advancing chain supporting sprockets 14 in the usual manner. The frame members 10 and 11 may, as usual, be connected by end frame members 11a. The web advancing chains or drive elements 15 as shown in Brown et at U.S. Pat. No. 3,216,491, (incorporated herein by reference) include web penetrating members 15a, which carry the plastic sheet or web P from a source of supply to the usual heating station H (FIG. 2) and on to the thermoforming or molding station S. Provided at station S, and powered by upper and lower drive cylinders 6, are the upper and lower platen and mold assemblies 17 and 18, respectively. The chain drive elements 15 are moved precisely in lengthy indexing steps separated by periods of dwell in which the mold assemblies 17 and 18 close and thermoforming is accomplished, via a system which forms the subject matter of the patented invention and will now be more specifically described.

Mounted on the frame F is a pump driven rotary hydraulic motor M having an output shaft 19 mounting a drive sprocket 20 which is connected with a sprocket 21 on an intermediate drive shaft 22 via a chain 23. The shaft 22 may be supported by frame members 10 and 11 in bearings 24, and a drive sprocket 25, provided on the shaft 22, drives input sprockets 26, (which, with other sprockets 26' carry the web advancing chains 15) via chains 27.

The brake, generally designated B, which is mounted on shaft 22, may be a conventional solenoid energized Warner Company electric brake which includes, for instance, a part 28, keyed to shaft 22 to rotate therewith, which has a brake shoe pad 28a. The part 28 is capable of slight axial movement on shaft 22 in the usual manner to bring the members 28a into braking engagement with aligned brake shoe members 29a provided on a fixed brake part 29 which does not rotate with shaft 22 and, rather, is held in fixed position by a frame bracket 30 to which it is attached by a member 31.

Figure 3:
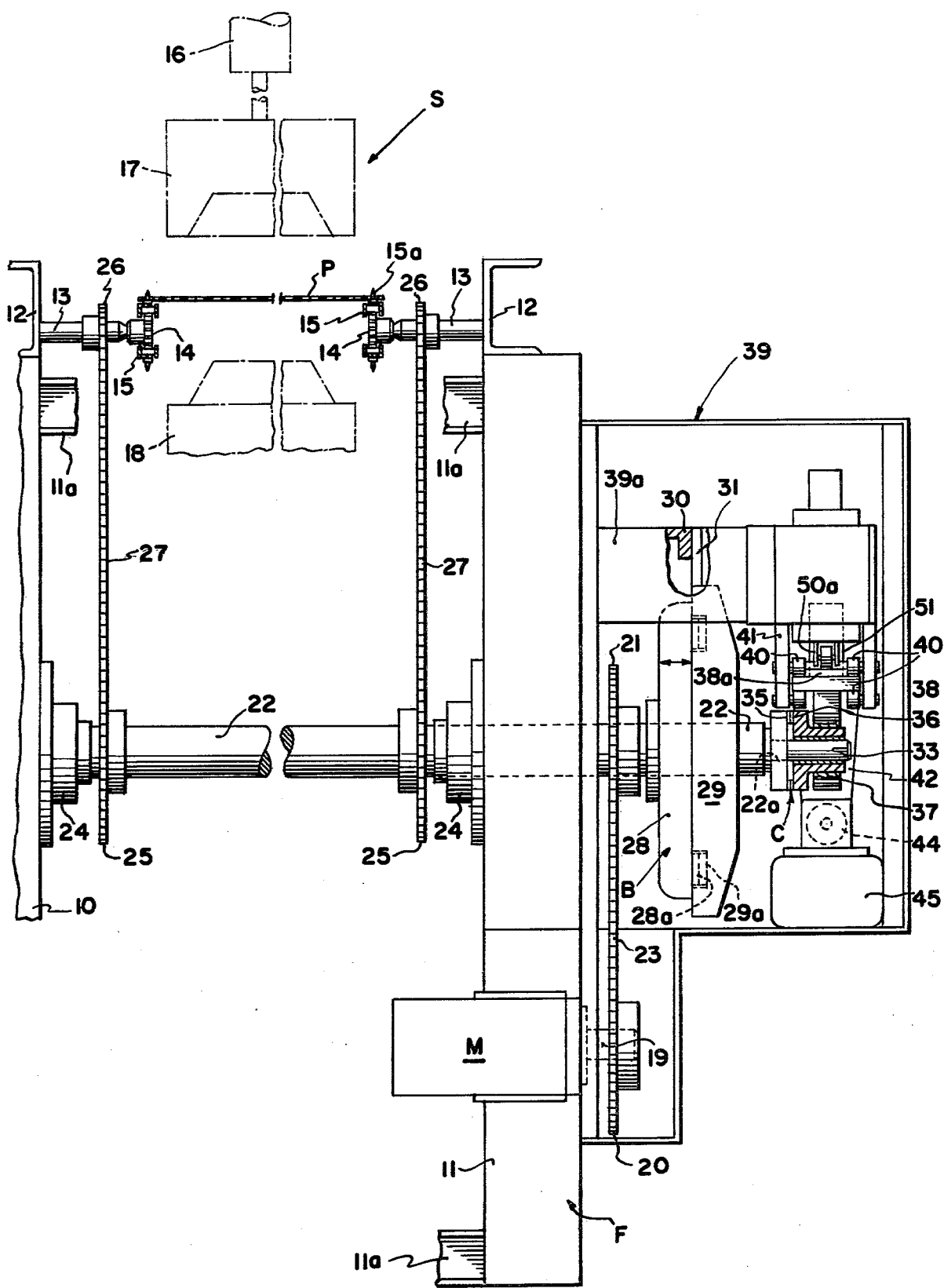
FIG. 3 is a fragmentary, end elevational view showing how the stroke measuring mechanism is driven by the drive transmission elements and depicting other thermoforming machine elements schematically.

It will be noted that shaft 22, at its right end in FIG. 3, is reduced as at 22a, and that a clutch C is mounted on this reduced end 22a of shaft 22. This electrically energized clutch can be of the conventional character manufactured by the Formsprag Company of Warren, Michigan and may comprise an axially movable part 32 keyed to the reduced end 22a of shaft 22 at 33, and a part 34 which is journaled thereon. Clutch contact pads 35 and 36 are provided on the clutch members 32 and 34 respectively, and plainly, when they are in axially engaged driving engagement, a drive pinion 37 mounted on part 34 will be driven by shaft 22.

The pinion 37 is provided to drive a stroke length measuring and controlling rack 38 which has a stroke length simulating the advancing stroke of the web advancing chains 15. A sub-frame, generally designed 39 supported on side frame 11 includes a brace 39a which mounts sets of guide rollers 40 for guiding a T-shaped rack 38 in a precise straight-line path, the rollers 40 being supported by a pair of spaced apart dependent legs 41 (FIG. 3) on brace 31 as shown. Depending from rack part 38 is a plate 42 connected with the piston rod 43 of a double acting rack return cylinder 44, which can be mounted on a sub-frame support beam 45.

As shown in FIG. 1, rack plate 42 mounts a contactor button 46 which, in the returned position of rack 38, has engagement with a threaded stroke length controlling stud 47 carried in axially adjusted position by a bracket 48 on beam 45, and held in position via jam nut 49. Also provided on rack 38 in predetermined spaced position relative to a limit switch actuator angle plate 51 is a linear cam 38a. As indicated by the broken lines in FIG. 1, the cam plate 38a, which is shown in diagrammatic lines in its forward position at x, engages and operates a stroke decelerating valve 50 which will presently be more specifically described. The plate 51 which, when the rack 38 is in returned position, holds the normally open contacts of a limit switch LS-2 in closed position is positioned (at the forward end of the stroke after deceleration has taken place) to engage a normally closed limit switch LS-1 to depress its actuator plunger and open the limit switch contacts for a purpose which again will shortly be described in more detail.

Referring now particularly to the hydraulic diagram, FIG. 3, a pressure line 52 is shown as connected to a suitable source of oil under pressure such as a motor driven pump 1, and a return line 53 is shown which, it is to be understood, will return to the pump reservoir R. A solenoid operated spring returned hydraulic valve 54 is provided to control the supply of hydraulic fluid to hydraulic motor M, and the deceleration valve 50 is shown connected in the return line 53 downstream from motor M. Branch pressure and return lines 52a and 53a respectively, lead to a second solenoid controlled, spring returned hydraulic valve 55, which controls rack return cylinder 44. While a cylinder 44 has been illustrated for the purpose of convenience, it is to be understood that other forms of drive return for the rack may be provided, such as a rotary motor or actuator which powers a pinion gear connected with the rack.

Figure 4:
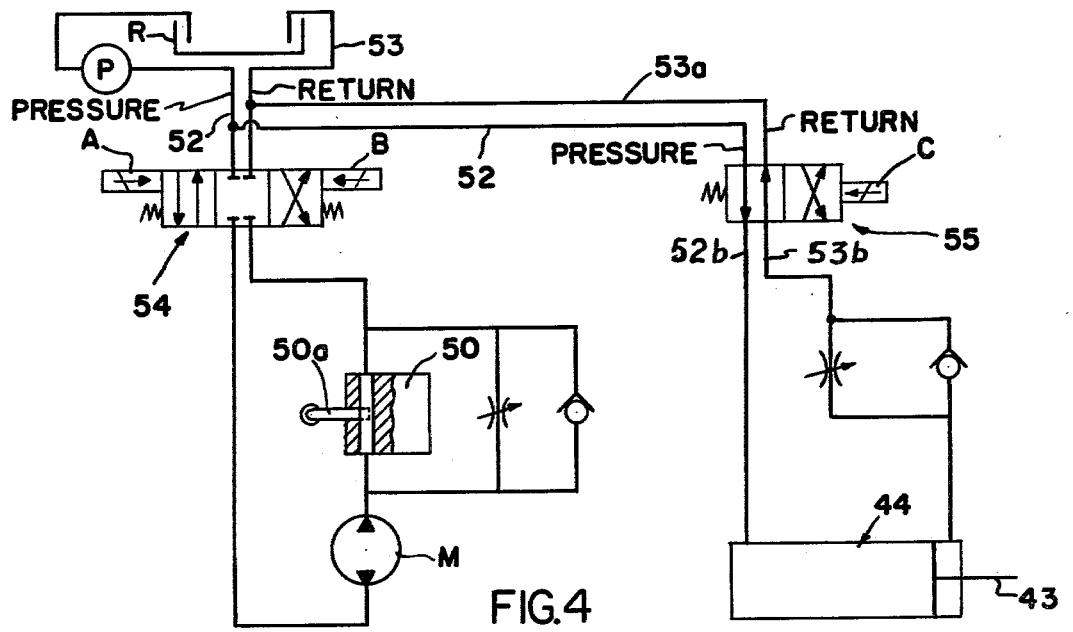
FIG. 4 is a schematic hydraulic diagram illustrating control elements which can be used with the system.

In FIG. 4, which depicts a typical electrical control system, relay contacts CR2 are provided in an electrical circuit line a in series with limit switch LS1, eye E, control relay CR1, and solenoids A and C. Relay contacts CR1a are connected in parallel with contacts CR2 as shown. Relay CR2 (which is not shown) is energized to close contacts CR2 at a time when a machine timer times out at the cycle of the thermoforming machine is ready to commence with the indexing of the plastic sheet P to a new indexed position. At this time, the previous differential pressure forming operation will have been completed and the mold assemblies 17 and 18 will have been returned to separated position. Circuit line b includes the normally closed contacts CR1b of relay CR1 in series with the brake B coil 56.

In circuit line c, normally open relay contacts CR1c are provided in series with the clutch C coil 57 and in parallel with the normally open contacts of limit switch LS-2. The solenoid B, which is shown in connection with valve 54, is one which is not in use and is not electrically connected in this particular system.

In operation, the length of stroke is governed by the position of the member 47 shown in FIG. 1, and it should be understood that the limit switch LS-2 is mounted for axial adjustment on a suitable slide mechanism or the like 56, so that it can be adjusted in the same manner as abutment 47 to perform its function.

In the start position, rack 38 will be in the returned position in which it is shown in FIG. 1 with the piston rod 43 of return cylinder 44 extended as far as permitted by the threaded stud 47. At this time, valve 55 will be in the position indicated in FIG. 3 in which pressure is being supplied via line 52a and line 53a is open to the return of oil. Valve 54 will be in the closed position in which it is shown in FIG. 3, in which oil from the pressure line 52 cannot reach the motor M, and in which the return line 53 is discommunicated from reservoir R.

With the energization of relay CR1, via closing of the cycle start contacts CR2, solenoid A is energized to move the valve 54 (rightward in FIG. 4) to the operating position in which oil is fed via pressure line 52 to the motor M and can return via line 53 to the reservoir. At this time oil is free to pass freely through the decelerating valve 50. Simultaneously solenoid C is energized, and valve 55 is shifted (leftward in FIG. 4) to effectively transfer the pressure line 52a from 52b to 53b returning cylinder 44. At this time oil is permitted to return via lines 52b and 53a, as the piston of cylinder 44 is moving leftward with the rack 38 in FIG. 1.

At the beginning of the cycle, and prior to energization of relay CR1, the brake coil 56 is energized and the brake is holding intermediate shaft 22 and the chains 15 in fixed position. The clutch coil 57 is also energized before the cycle ever starts, because plate 51 is holding limit switch LS-2 closed. Then, at the time relay CR1 is energized and limit switch LS-2 opens, relay contacts CR1c close to maintain the clutch coil 57 energized. The brake coil 56, however, is immediately deenergized because of the opening of relay contacts CR1b.

When cam 38a commences to depress the plunger 50a of valve 50, the supply of oil through valve 52 is gradually restricted and the speed of advance of chains 15 is decelerated. When plate 51 moves into engagement with, and actuates, limit switch LS1, control relay CR1 is deenergized. This, accordingly, will permit contacts CR1b to close and instantaneously energize brake coil 56 to brake the shaft 22 and chains 15. It will, at the same time, permit relay contacts CR1c to open to deenergize clutch coil 57 and disconnect the pinion 37 from shaft 22 and Motor M. At this time solenoids A and C will also be deenergized so that valves 54 and 55 return to the positions in which they are shown in FIG. 4. At this point, the supply of oil under pressure through line 52a will return the cylinder rod 43 and rack 38 from the extended position to the return position shown in FIG. 1, ready for commencement of the next sheet advancing cycle. Because a separate switch LS-2 is employed, which operates independently of valve 54 to insure that clutch C is engaged at the very beginning of the cycle, clutch coil 57 will always be energized at the time when rack 38 commences its next measuring stroke, and no motion will be lost.

Figure 2:
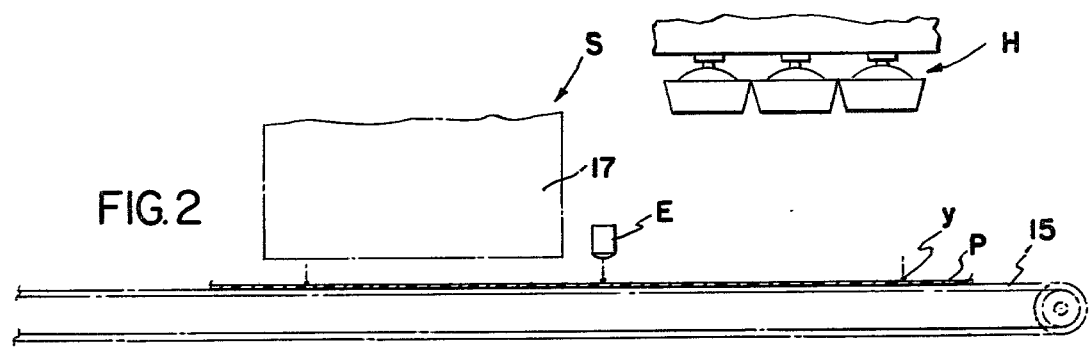
FIG. 2 is a reduced size, side elevational view showing the drive applied to advancing chains which are processing preprinted sheet.

In FIG. 2, a variation of the control system is disclosed wherein an electric eye E is used to sense color spots y which are provided at spaced apart intervals on preprinted plastic sheet P. The spots y, which may take any form and may be part of the printing which is preapplied to the plastic sheet P, need only be of sufficient difference-in-color that their presence is sensed by a difference-in-color sensitive electric eye E. Such electric eyes are, of course, commercially available and are utilized in many industries such as, for example, the packaging and printing industries.

Figure 5:
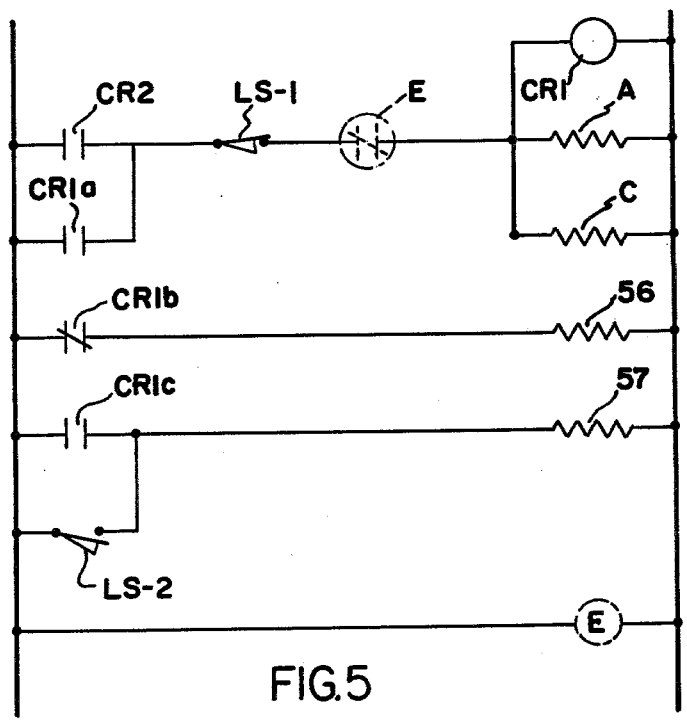
FIG. 5 schematically illustrates an electrical control system which can be used.

In FIG. 5, the eye E is shown as connected in circuit line d and it has normally closed contacts z which, when preprinted sheet is being processed, may be connected in circuit line a. When the system is used in this manner, the limit switch LS-1 functions only as a safety switch, to stop the chains 15 in the event the eye E does not open closed contacts z first of all at the time of arrival of a preprinted locator spot y below the eye E in FIG. 2. In this situation, the position of stud 47, and of limit switch LS-2, will be adjusted such that the stroke of rack 38 will be only just slightly longer than the interval between locator spots y. Thus, in this operation the eye contact z essentially will replace the limit switch LS-1, which is utilized only in the event contacts z failed to open.

While one embodiment of the invention has been described in detail, it will be apparent to those skilled in the art the disclosed embodiment may be modified. Therefore, the description is to be considered exemplary rather than limiting, and the true scope of the invention is that defined in the following claims.

What is claimed is:

1. In an indexing system for synthetic plastics molding machines including plastic web gripping drive elements movable in a planar path of travel and employed to feed a plastic web to the molds of said machine in indexing movements separated by periods of dwell; a motor system incorporating a motor and a drive transmission mechanism connected between the motor and drive elements for moving said drive elements; a braking device incorporated in the motor system for instantaneously braking the mechanism and drive elements to locate the latter in precise position; means for disabling the motor system to cease transmission of drive force to said drive elements; and a drive decelerating device connected with the motor system for slowing the drive imparted to said drive elements; the improvement comprising: a movable indexing stroke measuring device driven by the drive transmission mechanism in a path of movement corresponding with the indexing movement of said web gripping drive elements; and first and second control parts positioned to be engaged thereby, the movable stroke measuring device having first engagement near the end of the indexing movement with a part enabling the decelerating device and second engagement with a part connected to enable said braking device and said means for disabling the motor system.

2. The system of claim 1 wherein the plastic web gripping elements comprise web advancing chains with web grippers thereon; the drive transmission mechanism comprises a drive shaft independently drivingly connected to said chains and to said stroke measuring device; a clutch mechanism is provided to connect and disconnect the drive shaft with the stoke measuring device; and the motor system includes an intermittently operated pump driven rotary hydraulic motor connected to drive the drive shaft when the motor is being driven; there being a hydraulic motor control valve associated with the motor to permit or halt the supply of oil under pressure thereto.

3. The system of claim 2 wherein the stroke measuring device includes a rack driven via said drive shaft and clutch mechanism in a planar path of movement corresponding to the stroke of the web advancing chains; the rack incorporates a linear cam mounted at a predetermined position thereon; said first control part comprises a valve device operated by said cam near the end of the stroke of the rack for restricting the flow of fluid to power said motor to thereby decelerate the advancing chains; and said second control part comprises a switch, connected in a control circuit with said braking device and said motor control valve, for disabling the motor and energizing the braking device; there being a switch actuator included with the rack for actuating the switch at a predetermined time after said cam first engages the valve device.

4. The system of claim 3 wherein said switch is also connected to deenergize the drive transmitting clutch mechanism; rack return means is provided for returning the rack to original position at a time when the clutch mechanism is interrupting the drive to said rack.

5. The system of claim 4 in which means responsive to the return of the rack is provided for insuring that the cluth mechanism is energized and ready to transmit motion to the rack at the time the motor is energized to start the web indexing cycle.

6. In an indexing system for synthetic plastics molding machines including plastic web gripping drive elements movable in a planar path of travel and employed to feed a plastic web to the molds of said machine in indexing movements separated by periods of dwell; a motor system incorporating a motor and a drive transmission mechanism connected between the motor and drive elements for moving said driving elements; a braking device incorporated in the motor system for instantaneously braking the mechanism and drive elements to locate the latter in precise position; means for disabling the motor system to cease transmission of drive force to said drive elements; and a drive decelerating device connected with the motor system for slowing the drive imparted to said drive elements; the improvement comprising a movable indexing stroke measuring device driven by the drive transmission mechanism in a path of movement corresponding with the indexing movement of said web gripping drive elements; and a first control part connected to said drive decelerating device, positioned to be engaged thereby, the movable stroke measuring device having engagement near the end of the indexing movement with said part to enable the decelerating device and there being a second control part actuated thereafter which is connected to enable said braking device and said means for disabling the motor system.

7. The system of claim 6 wherein said second control part is an electric eye.

8. The system of claim 7 wherein an additional part connected to enable said braking device and said means for disabling the motor system is provided in the path of said movable stroke measuring device.

9. The system of claim 6 wherein means is provided for returning the stroke measuring device in the same path of movement to initial position; and means is provided in the path of return of the device for adjusting the stroke length of the device by varying the location of the initial position.

* * * * *